United States Patent Office 3,700,556
Patented Oct. 24, 1972

3,700,556
PROCESS FOR PRODUCING L-VALINE
Shigeo Abe, Tokyo, and Kenichiro Takayama, Chofu-shi, Japan, assignors to Kyowa Hakko Kogyo Co., Ltd., Tokyo, Japan
No Drawing. Continuation of abandoned application Ser. No. 565,104, July 14, 1966. This application July 15, 1968, Ser. No. 744,691
Claims priority, application Japan, July 16, 1965, 40/42,597
Int. Cl. C12d 13/06
U.S. Cl. 195—28 R         12 Claims

ABSTRACT OF THE DISCLOSURE

L-valine is produced by fermentation by culturing an isoleucine-, threonine- or homoserine-requiring microorganism in an aqueous nutrient medium under aerobic conditions at 25–40° C. Hydrocarbons are used in the medium as the major source of carbon. Preferred strains employed are *Arthrobacter paraffineus* and *Corynebacterium hydrocarboclastus*.

CROSS-REFERENCE TO RELATED APPLICATION

This application is a continuation of copending application Ser. No. 565,104, filed on July 14, 1966, which application is now abandoned.

This invention relates to a process for producing L-valine. More particularly, it relates to a process for the production of L-valine by fermentation. Even more particularly, the invention relates to a process for the production of L-valine by fermentation with certain microorganisms in the presence of at least one hydrocarbon as the major source of carbon.

L-valine, 2-amino-3-methylbutanoic acid, is an amino acid well known in the art. It has been classified as "essential" for maintaining the growth of rats and occurs especially in fibrous proteins. L-valine has been used medically as a nutrient and the recommended intake thereof for the normal adult male is 1.6 grams per day [Rose, Fed. Proc., volume 8, 546 (1949)].

Heretofore, the accumulation of L-valine by nutrient-requiring mutants has been obtained by utilizing a pantothenic acid-requiring strain of *Escherichia coli* [Journal of Bacteriology, volume 65, pages 388–393 (1953)] and an isoleucine-requiring strain thereof [*Exberiencha*, volume 6, pages 41–50 (1950)]. Furthermore, it has recently been recognized that a considerable amount of L-valine is accumulated by employing an isoleucine-requiring strain of *Micrococcus glutamicus* (Japanes patent publication 1,692/62). However, all of these methods for the production of L-valine use carbohydrate materials as the starting carbon source.

A process for the production of L-valine in which a hydrocarbon is used as the raw material has been reported by Yamada et al. [Agricultural and Biological Chemistry, volume 27, pages 390–395 (1963)]. However, the accumulated amount of L-valine obtained in accordance with this process is insignificant (38 mg./l.), and this process falls far short of the requirements for an industrial process for the production of L-valine.

One of the objects of the present invention is to provide an improved process for the production of L-valine which overcomes the disadvantages and deficiencies of the prior art methods.

Another object of the present invention is to provide a process for producing L-valine by fermentation which may be carried out in an efficacious and simple manner.

A further object of the invention is to provide a process for producing L-valine by fermentation which gives the product in high purity and good yield.

A still further object of the invention is to provide a process for producing L-valine by fermentation which may be carried out advantageously on an industrial scale at low cost with the use of inexpensive starting materials to give a high yield of product.

These and other objects and advantages of the present invention will become apparent to those skilled in the art from a consideration of the following specification and claims.

In accordance with the present invention, it has been found that remarkably large quantities of L-valine are accumulated in the fermentation liquor and may be recovered therefrom if fermentation or culturing is carried out with the particular strains noted below, which strains are capable of acting on hydrocarbons, in an aqueous nutrient culture medium containing at least one hydrocarbon as the major source. This process is industrially advantageous not only because hydrocarbons are an inexpensive starting material but also because a high yield of product is obtained therefrom.

Microorganism strains suitable for use in the process of the present invention include the isoleucine-, threonine- or homoserine-requiring strains of *Arthrobacter paraffineus* (KY 4302–H1 ATCC 19559) which are obtained by exposing *Arthrobacter paraffineus* KY 4302 ATCC 15590 to ultraviolet rays and the isoleucine-requiring strain of *Corynebacterium hydrocarboclastus* (KY 4309–H558 ATCC 19561) obtained by exposing *Corynebacterium hydrocarboclastus* (KY 4309 ATCC 15592) to ultraviolet rays.

As the hydrocarbon source to be employed in the culture medium used in accordance with the present invention, either one or more than one in admixture of the aliphatic hydrocarbons having from 10 to 20 carbon atoms may be used. Large amounts of L-valine are produced therewith. The highest yield of L-valine is obtained with the use of n-paraffins having from 13 to 18 carbon atoms. Examples of such hydrocarbons include paraffins such as n-decane, n-undecane, n-dodecane, n-tridecane, n-tetradecane, n-pentadecane, n-hexadecane, n-heptadecane, n-octadecane, n-nonadecane and eicosane.

Small amounts of other carbon sources such as glucose, fructose, mannose, galactose, sucrose, mannitol, sorbitol, starch hydrolysate, blackstrap molasses, etc. may be used in the fermentation medium along with the hydrocarbon.

Either a synthetic culture medium or a natural medium is suitable in the present invention as long as it contains the essential nutrients for the growth of the particular strain employed and, in accordance with the present invention, contains a hydrocarbon as the main carbon source therein. Such nutrients are well known in the art and include substances such as a nitrogen source, inorganic substances and the like which are utilized by the microorganism employed in appropriate amounts. As a nitrogen source, various kinds of inorganic or organic salts or compounds, such as urea or ammonium salts such as ammonium chloride, ammonium nitrate, ammonium sulfate, ammonium carbonate, ammonium phosphate, ammonium acetate, etc., or natural substances containing nitrogen such as cornsteep liquor, peptone, yeast extract, meat extract, soybean meal hydrolysate, casein hydrolysates, fish meal, etc., may be employed. Mixtures of two or more of these substances may be used. Inorganic compounds which may be added to the culture medium include necessary inorganic salts such as magnesium sulfate, potassium dihydrogen phosphate, potassium monohydrogen phosphate, sodium chloride, iron sulfate, as well as other conventionally used salts of magnesium, iron, manganese, zinc, calcium and the like. When a purely synthesized culture medium is employed, it is necessary to add thereto thiamine and isoleucine, threonine or homoserine, depending upon the particular strain employed.

The fermentation is conducted under aerobic conditions conventional in the art, such as aerobic shaking of the culture or with stirring of a submerged culture with the introduction of sterilized air thereinto, at a temperature of about 25° to 40° C. It is preferable to keep the pH of the culture medium during culturing on the neutral side. Thus, as soon as culturing is initiated, there occurs a tendency for the pH to go below 5.0–8.5; therefore, neutralization is then preferably utilized by adding calcium carbonate, ammonia water, sodium hydroxide, ammonium carbonate or the like to the culture medium. Culturing is generally carried out for from 2 to 5 days. During this period of time, a considerabe amount of L-valine is accumulated in the fermentation liquor.

After the completion of fermentation, the cells are removed from the liquor and conventional means is used to separate the L-valine product from the culture liquor, such as an ion exchange resin treatment as described in Example I hereinbelow.

It has been noted that the process of the present invention also provides L-threonine and $\alpha$-ketoglutaric acid, and small accumulations of L-glutamic acid, L-leucine, L-homoserine, L-serine and the like in the culture liquor. However, these small accumulations do not affect the advantageous production of L-valine accomplished by the present invention.

The following examples are given merely as illustrative of the present invention and are not to be considered as limiting. Unless otherwise noted, the percentages therein are by weight per liter of water.

EXAMPLE I

Ten ml. portions of culture or fermentation media are put into large test tubes. The culture or fermentation medium employed has the following composition:

0.1% $KH_2PO_4$
0.1% $Na_2HPO_4$
0.1% $MgSO_4 \cdot 7H_2O$
0.02% $FeSO_4 \cdot 7H_2O$
0.002% $MnSO_4 \cdot 4H_2O$
1.5% $NH_4NO_3$
0.2% yeast extract
5% of a mixture of n-paraffins having from 11 to 18 carbon atoms The pH of the fermentation medium is about 7.0. After sterilization thereof, 2% of $CaCO_3$, which has been prepared separately by dry sterilization, is added separately to each of the test tubes. Then, one platinum loop of the seed strain obtained by culturing *Arthrobacter paraffineus* KY 4302–H1 ATCC 19559 in a bouillon-yeast-agar slant at 30° C. for 24 hours is inoculated into the test tubes containing the aforesaid fermentation media.

Culturing is then carried out under aerobic conditions with vibration at 28° C. The results of analyses carried out during the culturing are shown in the table.

TABLE

| Culturing Time (days) | pH | Amount of L-valine produced (mg./ml.) |
|---|---|---|
| 3 | 5.7 | 6.8 |
| 4 | 5.4 | 8.8 |

Culturing is thus continued at 28° C. for 4 days. After this time, the microorganism cells are removed from the resultant fermentation liquor so as to obtain a filtrate. One liter of this filtrate (8.8. g./l. L-valine) is adjusted to a pH of 2 and adsorbed on an ion exchange resin [Diaion SK–1 (H type)]. A fraction positive to the ninhydrin reaction eluted with 1 N ammonia water is collected after washing the ion exchange resin column with water. This fraction is concentrated at a temperature below 40° C. under reduced pressure and decolorized with active carbon. Then, by adding ethyl alcohol thereto, 7.2 grams of crude crystals of L-valine is obtained.

EXAMPLE II

*Corynebacterium hydrocarboclastus* KY 4309–H558 ATCC 19561 is used as the seed strain. This strain is cultured with shaking in a bouillon medium at 30° C. for 24 hours. The resultant seed culture is inoculated in an amount of 5% by volume into 10 ml. portions of fermentation media contained in large test tubes. The fermentation medium employed is the same as that described in Example I except that 5% by weight of n-tridecane instead of the 5% by weight of a mixture of n-paraffins described is employed. After sterilization thereof, 2% by weight of separately prepared $CaCO_3$ is added to each of the test tubes containing the fermentation media prior to the said inoculation.

Culturing is carried out with aerobic shaking at 28° C. After 4 days of culturing, 7.5 mg./ml. of L-valine is found to be accumulated in the fermentation liquor.

EXAMPLE III

*Arthrobacter paraffineus* KY 4302–H1 ATCC 19559 is employed as the seed strain. This strain is cultured with vibration in a bouillon medium at 30° C. for 24 hours. The same culture medium described in Example I, except that 3% by weight of kerosene in lieu of the described 5% by weight of a mixture of n-paraffins, is employed. Ten ml. portions of the fermentation medium are poured into large test tubes and, after sterilization, 5% of the resultant seed culture is inoculated into each of the test tubes.

Culturing is carried out under aerobic conditions as described in the previous examples. During culturing, ammonia water is added to the culture medium so as to keep the pH thereof in the range of 6 to 8. After 4 days of culturing, the amount of L-valine accumulated in the fermentation liquor is 3.9 mg./ml.

Although kerosene is specifically shown in Example III, it is to be understood that other similar hydrocarbons such as light oils, heavy oils, paraffin oils and the like may be employed so long as they fall within the carbon number range described hereinabove.

The invention being thus described, it will be obvious that the same may be varied in many ways. Such variations are not to be regarded as a departure from the spirit and scope of the invention, and all such modifications as would be obvious to one skilled in the art are intended to be included herein.

What is claimed is:

1. A process for producing L-valine which comprises culturing a microorganism selected from the group consisting of *Arthrobacter paraffineus* ATCC 19559, and *Corynebacterium hydrocarboclastus* ATCC 19561, in an aqueous nutrient medium containing at least one hydrocarbon as the major source of carbon under aerobic conditions and recovering the accumulated L-valine from the resulting fermentation liquor.

2. The process of claim 1, wherein said hydrocarbon is an aliphatic hydrocarbon containing from 10 to 20 carbon atoms.

3. The process of claim 1, wherein said hydrocarbon is an aliphatic hydrocarbon containing from 13 to 18 carbon atoms.

4. The process of claim 1, wherein the pH of the culture medium is maintained at about 5.0–8.5.

5. The process of claim 1, wherein culturing is carried out at a temperature of from about 25° to 40° C.

6. The process of claim 1, wherein the L-valine is recovered by means of an ion exchange resin treatment.

7. The process of claim 1, wherein said microorganism is *Arthrobacter paraffineus* ATCC 19559.

8. The process of claim 1, wherein said microorganism is *Corynebacterium hydrocarboclastus* ATCC 19561.

9. A process for producing L-valine which comprises culturing *Arthrobacter paraffineus* ATCC 19559 or *Corynebacterium hydrocarboclastus* ATCC 19561 in an aqueous nutrient medium containing at least one n-paraffin containing from 10 to 20 carbon atoms as the major source of carbon under aerobic conditions at a temperature of from about 25° to 40° C. and recovering the accumulated L-valine from the resultant fermentation liquor.

10. The process of claim 9, wherein said n-paraffin contains from 13 to 18 carbon atoms.

11. The process of claim 10, wherein the pH of the culture medium is maintained at about 7.0.

12. The process of claim 11, wherein the L-valine is recovered by means of an ion exchange resin treatment.

References Cited

UNITED STATES PATENTS 3,222,258  12/1965  Iizuka et al. _____ 195—29

FOREIGN PATENTS 1,692  5/1962  Japan.
2,448  8/1962  Japan.

OTHER REFERENCES

Kinoshita, Chapter 6 in Biochemistry of Industrial Microorganisms (Rainbow and Rose, eds.), 1963, pp. 218–223.

LIONEL M. SHAPIRO, Primary Examiner